Patented Jan. 26, 1954

2,667,405

UNITED STATES PATENT OFFICE 2,667,405

PRODUCTION OF A MANGANESE DIOXIDE FOR USE AS DEPOLARIZER IN DRY CELLS

Wilhelm Müller, Leverkusen, and Heinrich Kircher, Köln, Germany, assignors to Farbenfabriken Bayer Aktiengesellschaft, Leverkusen, Germany, a corporation of Germany No Drawing. Application January 9, 1951, Serial No. 205,213

Claims priority, application Germany January 16, 1950

5 Claims. (Cl. 23—145)

In general manganese dioxide is used as depolarizer in dry cells. But not all manganese dioxides are equally well suited for this purpose. So far it was believed that manganese dioxide having $\gamma$ structure is a very good depolarizer in contradistinction to manganese dioxide having pyrolusite structure ($\beta$ MnO$_2$).

The present invention relates to dry cells wherein $\alpha$-manganese dioxide is arranged as a depolarizer in the same manner as $\gamma$-manganese dioxide is arranged hitherto, with equally good properties. Depolarizers in dry cells containing a substantial amount of $\alpha$-manganese dioxide display very good properties.

According to one feature of the invention $\alpha$-manganese dioxide is prepared according to a new process.

This new process for the production of $\alpha$-manganese dioxide from amorphous manganese dioxide or also $\gamma$-manganese dioxide consists in treating these starting materials with mineral acids. For this purpose in particular sulfuric acid or nitric acid are used. The concentration of the acids used may be varied in wide ranges, in general mineral acids of medium to higher concentration, for instance acids of 50–100% strength are used. It is of advantage to carry out the treatment at higher temperatures because conversion takes place more rapidly. A cheap and excellently suitable starting material for producing $\alpha$-manganese dioxide is the so-called Weldon mud obtained as a by-product in the alkaline oxidation of organic compounds by means of permanganate. This mud contains considerable quantities of alkali which cannot be removed by washing with dilute acids and which up to the present time prevented the use of the manganese mud for dry cells. In accordance with the process of the present invention this alkali is dissolved out of the mud and at the same time the manganese dioxide being amorphous to X-rays prior to the treatment is converted into $\alpha$-manganese dioxide. $\alpha$-Manganese dioxide so far was obtained by precipitating aqueous manganese salt solutions with strong oxidizing agents, such as potassium persulfate.

The invention is further illustrated by the following examples without being restricted thereto, the parts being by weight:

Example 1

50 parts of manganese mud as is obtained in the production of saccharin are treated with 250–500 parts of sulfuric acid of 92% strength while vigorously stirring for about half an hour to one hour at a temperature ranging between about 70° C., and about 120° C. until the reaction proceeding with the evolution of gas is complete. The manganese mud is then sucked off, washed with water until free from acid, and dried at 105° C. After this treatment the manganese dioxide is free from alkali and the product which was previously completely amorphous to X-rays is converted into $\alpha$-manganese dioxide. The product obtained in this manner is excellently suited as a depolarizer.

Example 2

50 parts of manganese mud of the kind described in Example 1 are treated for about 1 hour with 250–500 parts of sulfuric acid of 50% strength at a temperature ranging between 90° C. and 120° C. The product obtained is pure $\alpha$-manganese dioxide.

Example 3

50 parts of manganese mud of the kind described in Example 1 are boiled with concentrated nitric acid for half an hour to one hour. Instead of using concentrated nitric acid it is also possible to use nitric acid of about 50% strength, in which case boiling is effected for a somewhat longer time. Also in that case pure $\alpha$-manganese dioxided is obtained while simultaneously dissolving out the alkali. The acids obtained from sucking off the $\alpha$-manganese dioxide formed may be used for converting and de-alkalizing other quantities of manganese mud, $\gamma$-manganese dioxide respectively into $\alpha$-manganese dioxide.

We claim:

1. Process for production of $\alpha$-manganese dioxide which comprises heating a manganese dioxide selected from the group consisting of amorphous and $\gamma$-manganese dioxide with a mineral acid of about 50–100% strength to a temperature of about 70 to 120° C. for a period of time of about ½ to 1 hour, interrupting the heat treatment, removing the acid from the $\alpha$-manganese dioxide formed, washing the $\alpha$-manganese dioxide until free from acid and drying.

2. Process according to claim 1 in which said mineral acid is sulfuric acid.

3. Process according to claim 1 in which said mineral acid is nitric acid.

4. Process according to claim 1 in which said manganese dioxide which is heated is in the form of a mud obtained by the oxydation of an organic compound with a permanganate.

5. In a dry cell, the improvement which comprises a depolariser consisting of $\alpha$-manganese dioxide obtained by the heating of a manganese dioxide selected from the group consisting of amorphous and γ-manganese dioxide with a mineral acid of about 50–100% strength to a temperature of about 70° to 120° C. for a period of time of about ½ to 1 hour, interrupting the heat treatment, removing the acid from the α-manganese dioxide formed and washing said α-manganese dioxide until it is free from acid and drying.

WILHELM MÜLLER.
HEINRICH KIRCHER.

References Cited in the file of this patent
UNITED STATES PATENTS

| Number | Name | Date |
|---|---|---|
| 1,287,041 | Kaplan | Dec. 10, 1918 |
| 1,291,867 | Haslup | Jan. 21, 1919 |
| 1,305,252 | Burgess | June 3, 1919 |

OTHER REFERENCES

Bolen-Weil, "Literature Search on Dry Cell Technology with Special Reference to Manganese Dioxide and Methods for its Synthesis," pages 14, 138, 139, 309, 316, 364, Edwards Bros., Inc., Ann Arbor, Michigan.

J. W. Mellor's "A Comprehensive Treatise on Inorganic and Theoretical Chemistry," vol. 12 (1932), pages 246 and 255. Longmans, Green and Co., N. Y.